Jan. 13, 1942.  F. S. SAUNDERS  2,270,203
WORK HOLDER FOR AIRSCREWS
Filed March 4, 1941   7 Sheets-Sheet 6

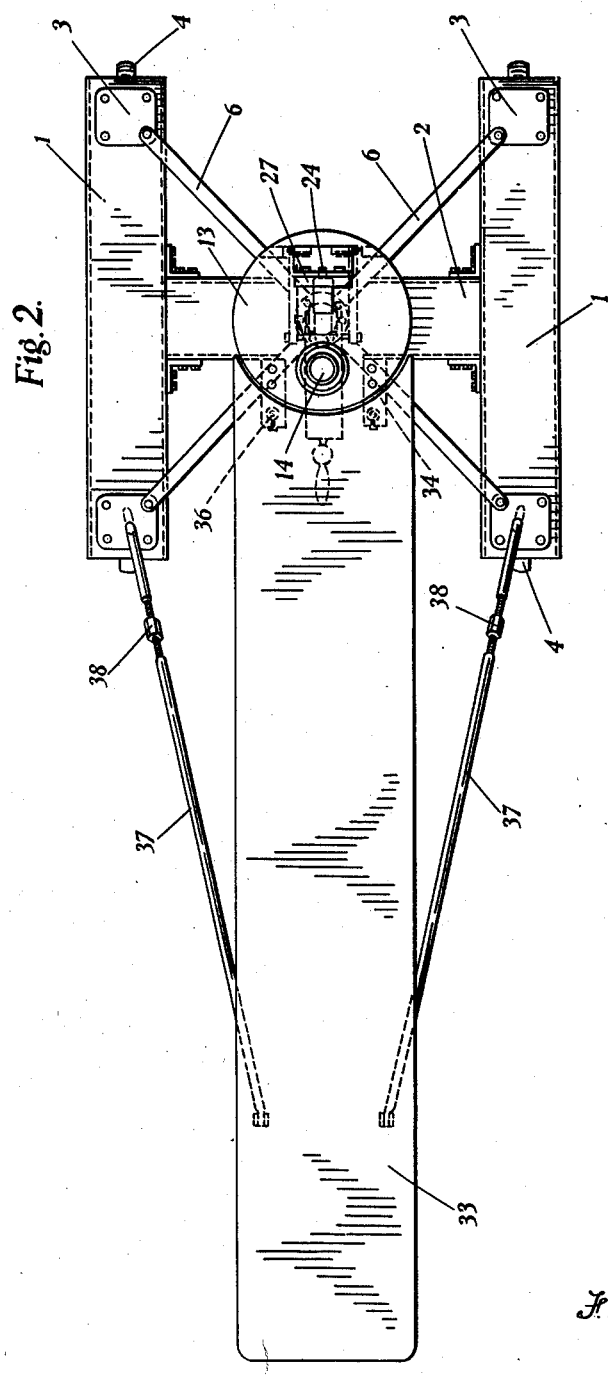

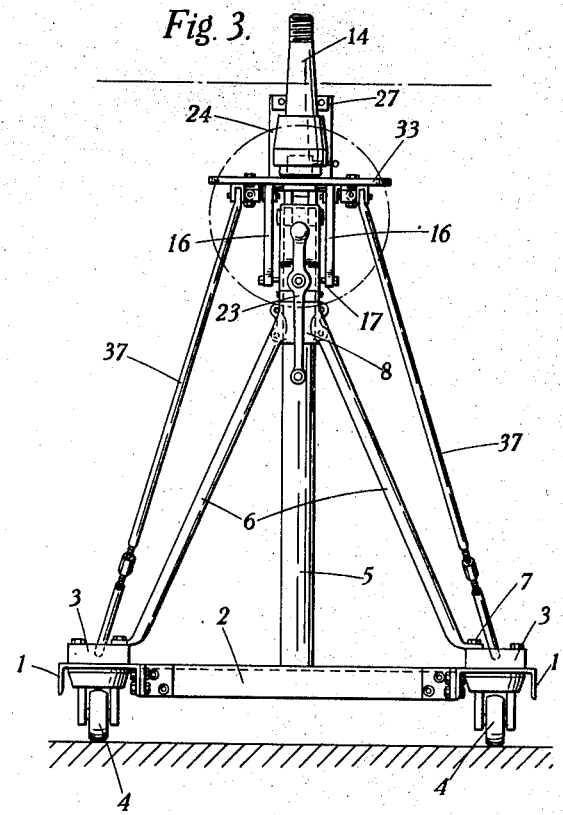
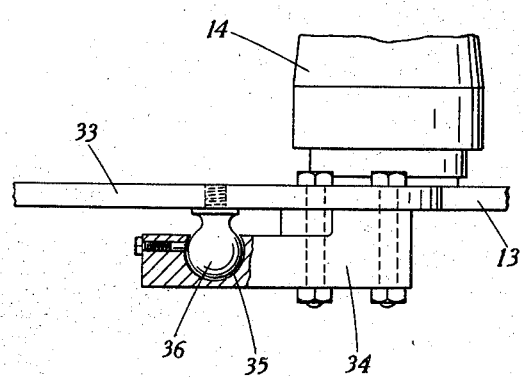

Inventor
H. Stanley Saunders
by
A. Knight Croad
Attorney

Jan. 13, 1942. F. S. SAUNDERS 2,270,203
WORK HOLDER FOR AIRSCREWS
Filed March 4, 1941 7 Sheets-Sheet 7

Inventor
F. Stanley Saunders
by
A. Knight Leroad
Attorney

Patented Jan. 13, 1942

2,270,203

UNITED STATES PATENT OFFICE 2,270,203

WORK HOLDER FOR AIRSCREWS

Frank Stanley Saunders, Dibden Purlieu, Southampton, England

Application March 4, 1941, Serial No. 381,639½
In Great Britain February 15, 1940

4 Claims. (Cl. 29—89)

This invention relates to a stand for use in assembling, dismantling, overhauling and effecting all operations on airscrews or propellers and it has for its object the provision of a portable yet rigid stand on which all operations, including storage and transportation, may be carried out on all types of airscrews, and, to this end, the stand comprises a base member mounted on wheels, a central pillar, a plurality of legs secured to the pillar and to the base member, a supporting plate hingedly mounted at the top of said pillar, a mandrel provided on said supporting plate for receiving the airscrew and means for varying the plane or angular position of the supporting plate and for maintaining same rigid in any position.

It is also proposed to provide the stand with a removable and adjustable table capable of being attached to and used in conjunction with the supporting plate for setting the angle of the blades.

The base of the stand may, if desired, be provided with two or more lifting jacks.

It is further proposed to provide the supporting plate with means for locking the airscrew against rotation during certain operations.

In the accompanying drawings which illustrate this invention:

Figure 2 is a plan, and,

Figure 3 is a front elevation.

Figure 4 is a side elevation on an enlarged scale of a detail of construction;

Figure 1:
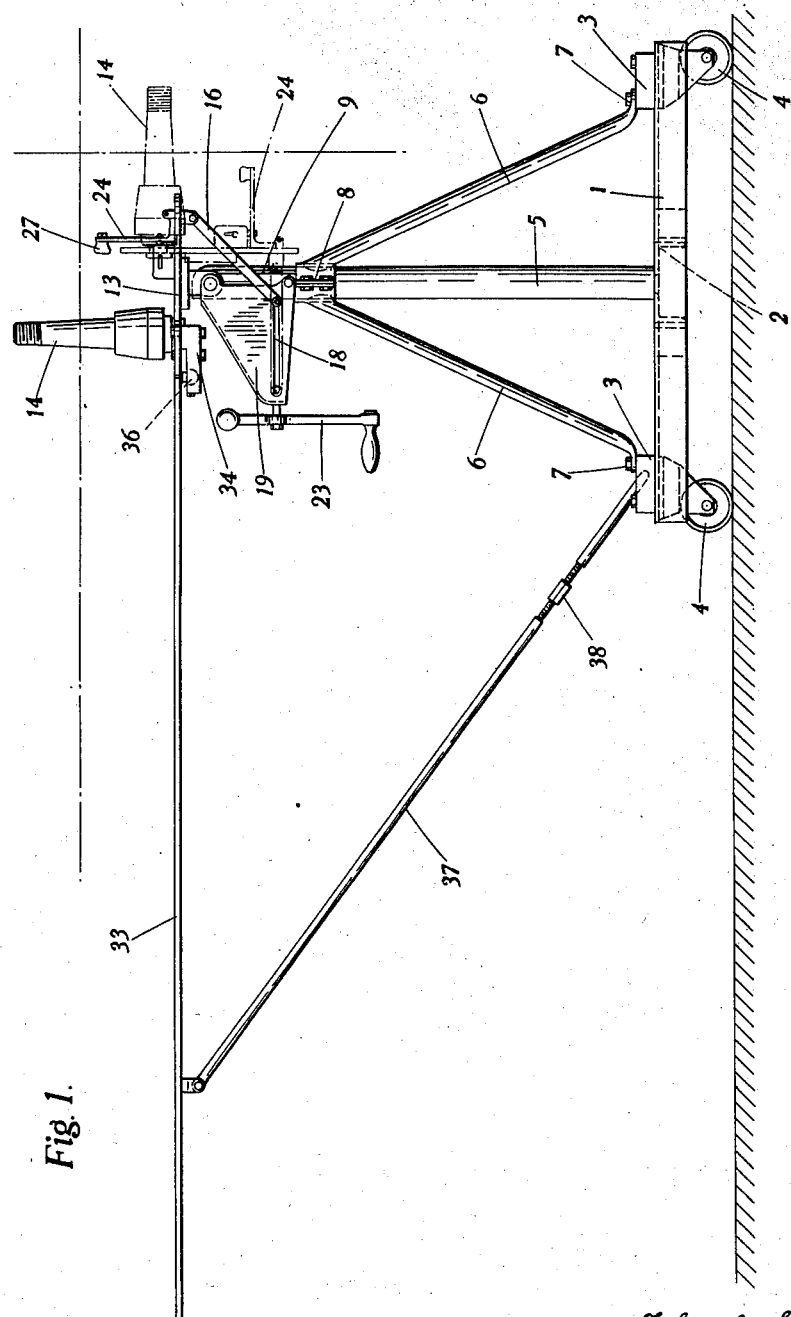
Figure 1 is a side elevation of one embodiment.
Figure 5:
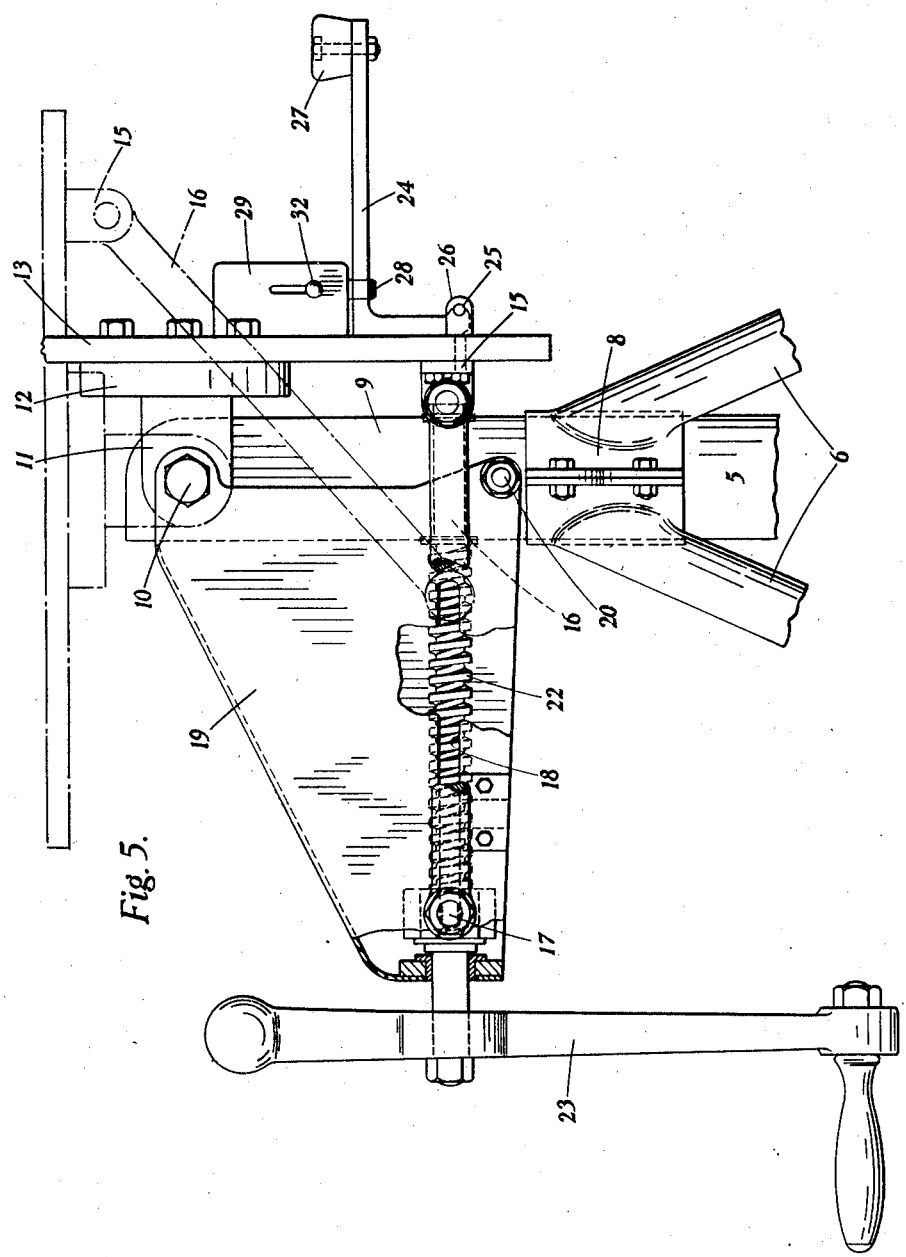
Figure 5 is a side elevation on an enlarged scale of the means for adjusting the supporting plate.
Figure 6:
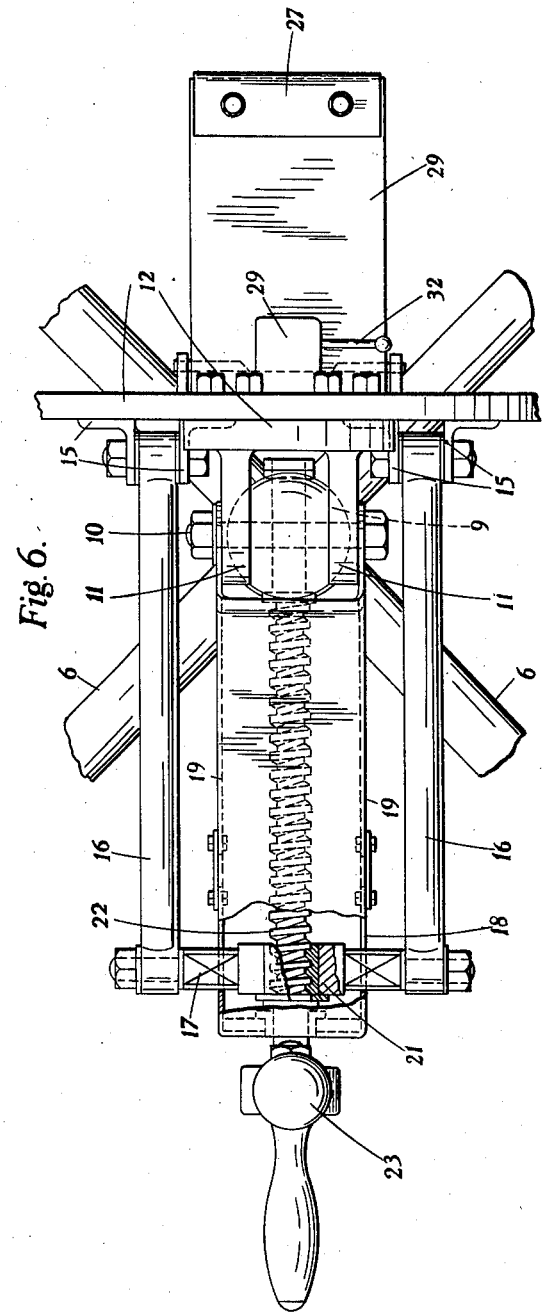
Figures 6 and 7 are plan and rear elevation respectively of Figure 5.
Figure 7:
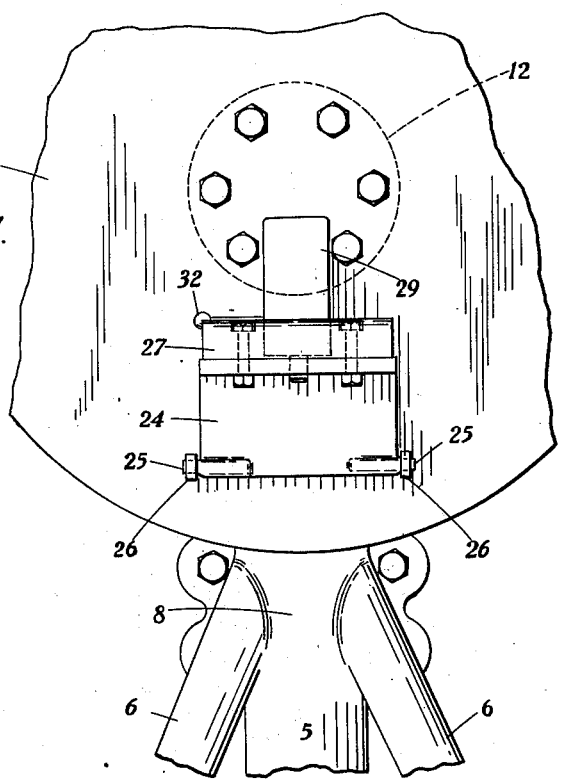

In the embodiment of the invention illustrated in the drawings the stand comprises a base composed of two longitudinal members 1 and a cross member 2 each of U-shape in cross section, arranged in H-formation, and the four corners of the base thus are fitted with blocks 3 by means of which castors 4 may be secured to the underside of the members 1. The lower end of a central tubular pillar 5 is secured to the cross member 2, said pillar being made rigid and maintained in a vertical position by means of four legs 6, the lower ends of said legs being secured to the castor blocks 3 by bolts 7 and the upper ends are secured to the upper end of the pillar by a clamp 8. The top of the pillar 5 is provided with a solid pin 9, the lower end of which is located in the top of the tubular pillar 5 and secured in the desired position by the clamp 8. The upper end of the member 9 is drilled transversely to receive a pin 10 on which are pivotally mounted the lugs 11 on a swivel plate 12 to the outer face of which is secured a supporting plate 13 which latter is provided approximately midway between the centre of the plate and its periphery with a mandrel 14 upon which the hub of the airscrew may be secured.

As it is necessary to provide mechanism for adjusting and maintaining the supporting plate 13 rigid while in use, two pairs of angle brackets 15 are secured to the underside of the supporting plate on the opposite side of the centre to the mandrel 14, and one end of each of a pair of links 16 is pivotally mounted in said brackets, the opposite ends of said links being pivotally connected to the ends of a cross-bar 17 slidably mounted in slots 18 provided in the side plates 19 of a box-like structure secured by the pin 10 and bolt 20 to the member 9 immediately below the supporting plate 13. The cross-bar 17 is furnished with a screw threaded central boss 21 mounted on and meshing with a screw threaded spindle 22 rotatably mounted in said box-like structure, a handle 23 being provided for rotating said spindle and thereby causing the cross-bar to travel on the spindle when it is desired to vary the position of the supporting plate.

Figure 8:
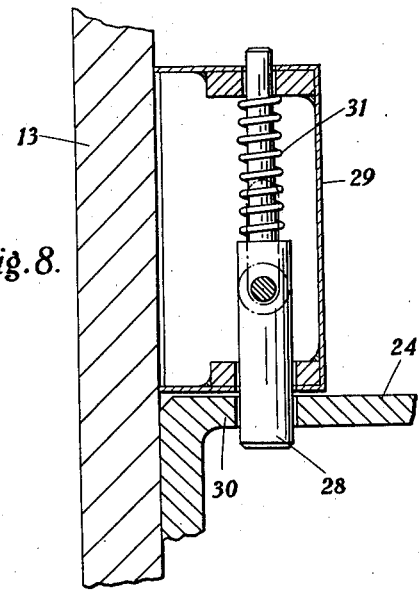
Figure 8 is a sectional elevation of a detail of construction.

For the purpose of preventing the rotation of the airscrew while on the mandrel 14 during certain operations, the supporting plate 13 is provided with a locking device comprising an L-shaped member 24, the end of the short leg of said member being pivoted on pins 25 to lugs 26 provided on the plate 13, while the end of the long leg is provided with a stop member 27 of fibre or other suitable material. The means for maintaining the stop member 27 in the operative position comprises a locking pin 28 located in a box 29 secured to the outer face of the plate 13, said pin being normally pressed outwardly from the box into engagement with an aperture 30 in the long leg of the member 24 by a spring 31 (Figure 8) means, such as a handle 32 or other suitable means, being provided for drawing the pin out of engagement when it is desired to move the stop into or out of engagement.

The stand is further provided with a support for enabling the stand to be employed for setting the angle of the blades and said support comprises a long narrow table 33 adapted to lie horizontally and flush with the supporting plate 13, the end of said table adjacent the plate being shaped to fit round said plate (Figure 2) which is furnished on its under face with projecting supports 34 having sockets 35 to receive ball-shaped parts 36 secured to the under face of the table. The table 33 is provided adjacent its outer end with two legs 37, the lower ends of which are adapted to seat in recesses provided in the castor blocks 3 on the base of the stand, each of said legs being furnished with means, such as that shown at 38, for adjusting the length thereof as desired.

The base of the stand may be provided with one or more lifting jacks by means of which it may be prevented from moving or for the purpose of levelling the stand on the floor or other surface.

Figure 9:
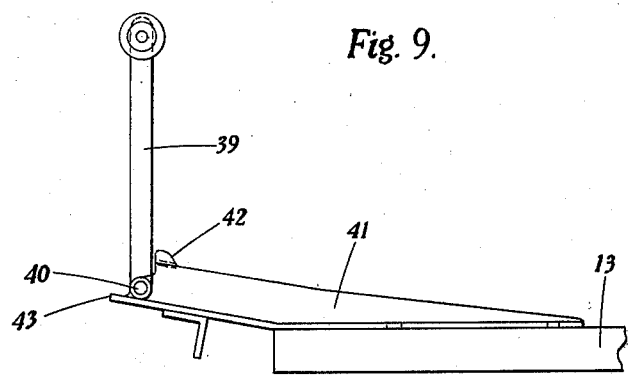
Figure 9 is a side elevation of a modified form of locking device.
Figure 10:
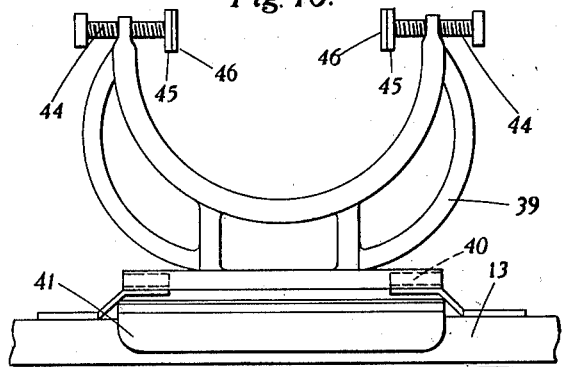
Figure 10 is an end elevation thereof.
Figure 11:
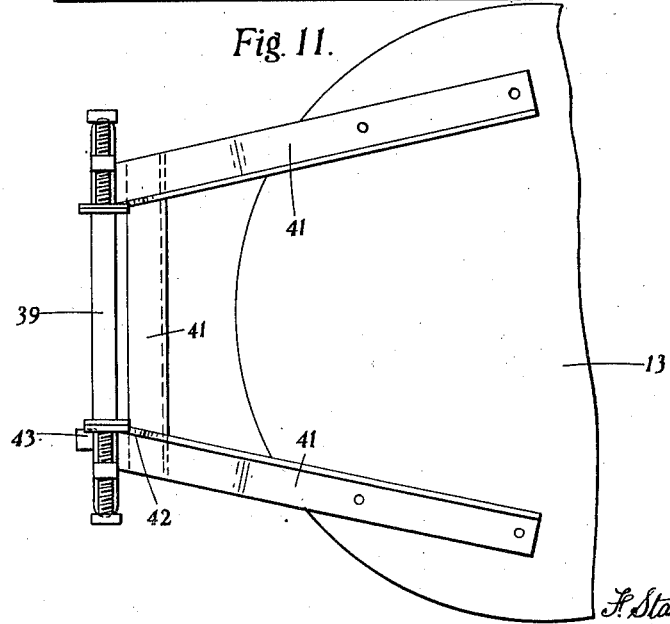
Figure 11 is a plan of said device.

A modified form of locking device for preventing the rotation of the airscrew while on the mandrel 14 is illustrated in Figures 9, 10 and 11 and comprises a bow-shaped member 39 hinged at 40 to a U-shaped frame 41 composed of three angle-iron members welded together, the two legs being secured to the supporting plate 13 in any convenient manner. The frame 41 is provided with two stops 42 and 43 for limiting the movements of the member 39 in the upward and forward direction and in the rearward and downward direction respectively. The free ends of the bow-shaped member 39 are provided with set screws 44, the inner ends of which are furnished with heads 45 rotatably mounted on the ends of the screws, the inner faces of said heads being faced with leather washers 46 riveted or otherwise secured thereto.

When the airscrew is mounted on the mandrel 14 a blade thereof is placed in the bow-shaped member 39 and the screws 44 are moved towards each other until the leather washers 46 bear firmly against the blade.

What I claim is:

1. A work holder for airscrews comprising in combination a standard, a supporting plate hingedly mounted at the top of said standard, a mandrel on said supporting plate for receiving the airscrew, means for varying the angular position of the supporting plate and for maintaining same in any desired position, and means for preventing the rotation of the airscrew on the mandrel during certain operations comprising an L-shaped member, the short leg of which is pivoted on the supporting plate, a stop member on the end of the long leg, a spring controlled pin arranged to engage said L-shaped member and means for effecting the disengagement of said pin.

2. A work holder for airscrews comprising in combination a standard, a supporting plate hingedly mounted at the top of said standard, a mandrel on said supporting plate for receiving the airscrew, means for varying the angular position of the supporting plate and for maintaining same in any desired position, and means for preventing the rotation of the airscrew on the mandrel during certain operations comprising an approximately U-shaped frame secured to the supporting plate, a bow-shaped member hingedly mounted on said frame, means for limiting the movement of said bow-shaped member in both directions and adjustable means mounted in the free ends of said bow-shaped member for gripping the blade of the propeller.

3. A work holder for airscrews comprising in combination a standard, a pin secured to the top of said standard, a swivel plate pivotally mounted at the upper end of said pin, a supporting plate secured to said swivel plate, a mandrel eccentrically positioned on said supporting plate, a box-like structure comprising a pair of side plates secured to the pin, a cross-bar slidably mounted in said side plates, a pair of links, the ends of which are pivotally connected to the cross-bar and to the underside of the supporting plate respectively, and means for traversing the cross-bar in said side plates when it is desired to vary the position of the supporting plate.

4. A work holder for airscrews comprising in combination a standard mounted on wheels, by said clamp, a solid pin secured by said clamp to the top of said standard, a swivel plate pivotally mounted at the upper end of said pin, a supporting plate secured to said swivel plate, a mandrel eccentrically positioned on said supporting plate, a box-like structure comprising a pair of side plates secured to the solid pin, a cross-bar slidably mounted in said side plates, a pair of links, the ends of which are pivotally connected to the cross-bar and to the underside of the supporting plate respectively, a screw threaded boss centrally disposed on said cross-bar, a screw threaded spindle meshing with said boss rotatably mounted in said box-like structure, means for rotating said spindle when it is desired to vary the position of the supporting plate, and means hingedly mounted on the supporting plate for preventing the rotation of the airscrew on the mandrel during certain operations.

FRANK STANLEY SAUNDERS.